United States Patent Office 3,359,323
Patented Dec. 19, 1967

3,359,323
PROCESS FOR THE SYNTHESIS OF
4-HYDROXYRETINAL
Albert J. Reedy, Rochester, N.Y., assignor to Eastman Kodak Company, Rochester, N.Y., a corporation of New Jersey
No Drawing. Filed June 28, 1965, Ser. No. 467,765
8 Claims. (Cl. 260—598)

This invention resides in the chemical arts. More particularly, it relates to a process for making 4-hydroxyretinal.

4-hydroxyretinal is a compound represented by the following structural formula:

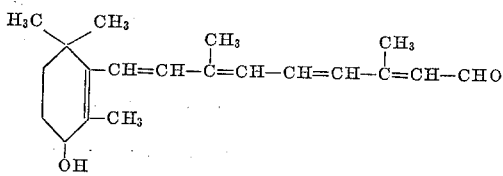

It is useful as an intermediate in the synthesis of oxygenated carotenoids which have utility as poultry shank and egg yolk pigmenters, and as food colorants. 4-hydroxyretinal can be readily oxidized for example, by manganese dioxide, to 4-oxoretinal which has utility also as an intermediate in the synthesis of oxygenated carotenoids.

An object of this invention is to provide a new process for the synthesis of 4-hydroxyretinal.

A specific object of this invention is to provide a new process for making 4-hydroxyretinal from readily available materials.

Still another object is to provide such a process which is characterized by simplicity, by the ease with which it can be practiced and by being economical to practice.

These and other objects which appear as this specification proceeds are achieved by this invention.

In summary, this invention comprises a process for the synthesis of 4-hydroxyretinal, which comprises: contacting retinal enol acetate with selenium dioxide in a specific, liquid, reaction medium, whereby a reaction product is formed; and contacting said reaction product with water.

Retinal enol acetate is a compound according to the following structural formula:

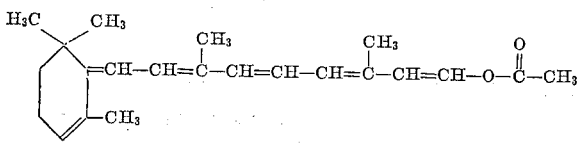

At 20-35° C. and in substantially pure condition it is a crystalline material. It can be made by reacting retinal (vitamin A aldehyde) and acetic anhydride.

Selenium dioxide at 20-25° C. is a solid material. It preferably is employed in the process of this invention in finely divided condition. Generally the quantity of this material used is at least substantially chemically equivalent to the quantity of retinal enol acetate and preferably is more than a chemically equivalent quantity. Satisfactory results have been obtained at mole ratios of selenium dioxide to retinal enol acetate in a range from about 15:1 to about 3:1.

The liquid reaction medium is selected from the group consisting of tetrahydrofuran, acetic acid, benzene and 1,4-dioxane. Best results have been obtained with tetrahydrofuran and, therefore, it is the preferred reaction medium under the concepts of this invention.

The quantity of liquid reaction medium employed to carry out the reaction of this invention is generally a quantity at least sufficient to dissolve substantially all of the retinal enol acetate present. However, larger and smaller quantities are within the concepts of this invention. Quantities of tetrahydrofuran, for example, in a range from about 3 to about 10 times the weight of retinal enol acetate have given satisfactory results.

The contacting of retinal enol acetate with selenium dioxide in the liquid reaction medium is performed by admixing these materials at 20-25° C. Preferably the resulting reaction mixture is stirred at 20-25° C. for a period of time generally in a range from about 3 to about 18 hours. Greater and lesser times are within the concepts of this invention, however. On the other hand, a reaction time of about 16 hours generally results in maximum conversion of the retinal enol acetate to the desired reaction product.

The contacting of the reaction product with water is performed by admixing the reaction product with generally at least a substantially chemically equivalent quantity of water and preferably with more than a chemically equivalent quantity of water. Preferably this is done under basic conditions and at a temperature of about 20-25° C. Because the reaction here is substantially instantaneous, the period of time to carry out this step can be whatever is desired.

Preferably, the water contacting step is performed subsequent to the selenium dioxide treatment step. However, under the concepts of this invention the water contacting step can be performed simultaneously with the selenium dioxide contacting step.

The product resulting from the water contacting step consists essentially of 4-hydroxyretinal. Preferably this compound is isolated and this can be done by procedures well known to those in the exercise of ordinary skill in the art.

This invention is further illustrated by the following examples which include preferred, specific embodiments of the process of this invention. This invention is not limited to these specific embodiments, unless otherwise indicated.

*Example 1*

This example illustrates the synthesis of retinal enol acetate.

58 grams (0.204 mole) of retinal are dissolved in 725 milliliters of diethyl ether and the resulting solution is cooled to 0° C. 109 milliliters (1.1 moles) of acetic anhydride at 0° C. and containing three drops of concentrated sulphuric acid are admixed with the retinal solution. The resulting reaction mixture is stored for three days at 5° C. At the end of this time the reaction mixture is washed twice with cold water, three times with 0.5 N potassium hydroxide and twice with water, dried over anhydrous sodium sulfate and the diethyl ether evaporated. The result is a crude product consisting essentially of retinal enol acetate. A typical quantity of the crude product is 66.8 grams and typical light absorption data are E (1%, 1 cm., ethanol) (354, $\underline{372}$, 393 m$\mu$)=$\underline{2134}$, representing about a 70% yield.

The crude product is triturated with petroleum ether. The petroleum ether is removed by filtration and evaporation. The result is a crystalline product that consists essentially of retinal enol acetate. A typical quantity of crystalline product is 31.5 grams and typical light absorption data are E (1%, 1 cm., ethanol) (355, $\underline{373}$, 394 m$\mu$)=$\underline{2854}$, which indicates about a 44% yield of the desired product.

*Example 2*

This example illustrates the oxidation of retinal enol acetate to 4-hydroxyretinal according to a specific embodiment of the process of this invention.

1 gram (0.0031 mole) of retinal enol acetate is dissolved in 3 milliliters of tetrahydrofuran. 1 gram (0.009 mole) of finely pulverized selenium dioxide is admixed with the solution of retinal enol acetate and tetrahydrofuran, and the resulting mixture, a suspension of selenium dioxide in the solution, is stirred under nitrogen at 20–25° C. for 16 hours.

The resulting reaction mixture is diluted with 50 milliliters of diethyl ether, a quantity sufficient to dissolve substantially all of the desired reaction product in said mixture, and filtered through Celite filter medium. The filter medium is washed with 100 milliliters of diethyl ether and the combined ether fractions are washed with 0.5 N potassium hydroxide and with water. The washed diethyl ether solution is then dried over anhydrous sodium sulfate and the diethyl ether is removed by evaporation. The residue is a product consisting essentially of 4-hydroxyretinal. A typical yield of product is 911 milligrams and, when a retinal enol acetate is employed which has the typical light absorption data of Example 1, the 4-hydroxyretinal product has a typical light absorption value of E (1%, 1 cm., ethanol) (371 m$\mu$)=1121. Under these conditions a typical yield of the 4-hydroxyretinal is 80%.

*Example 3*

This example illustrates the synthesis of 4-hydroxyretinal by another specific embodiment of the process of this invention.

0.5 gram of retinal enol acetate in 5 milliliters of acetic acid is admixed with a solution of 1 gram selenium dioxide in 1 milliliter of water. The resulting mixture is stored at 20–25° C. for 2½ hours. The result is a product consisting essentially of 4-hydroxyretinal. A typical light absorption value for the product is E (1%, 1 cm., ethanol) (370 m$\mu$)=782. Typically the product does not have the purity of that of Example 2.

*Example 4*

This example illustrates the synthesis of 4-hydroxyretinal by still another specific embodiment of the process of this invention.

1 gram of retinal enol acetate is dissolved in 9 milliliters of tetrahydrofuran. 0.5 gram of selenium dioxide in 1 milliliter of water is admixed with the solution of retinal enol acetate and tetrahydrofuran, and the resulting mixture is stirred at 20–25° C. for 20 hours. The resulting product consists essentially of 4-hydroxyretinal. A typical quantity of the product obtained thereby is 0.9 gram. Typical light absorption data when employing a retinal enol acetate having the light absorption data of Example 1 are E (1%, 1 cm., ethanol) (370 m$\mu$)=1330 and typical infrared data indicate the product to consist essentially of about 70% 4-hydroxyretinal and about 30% unreacted retinal enol acetate.

Thus, this invention provides a process for the synthesis of 4-hydroxyretinal from retinal enol acetate. Moreover, it provides a process for the synthesis of 4-hydroxyretinal from retinal.

The process of this invention occupies a unique position because retinal does not appear to be oxidized by selenium dioxide in tetrahydrofuran, and such known oxidizing agents as manganese dioxide, mercuric acetate in acetic acid, mercuric acetate in pyridine, lead dioxide and t-butyl chromate do not appear to oxidize retinal enol acetate to 4-hydroxyretinal. Moreover, in liquid reaction media such as alcohols, water alone, hexane, and pyridine, selenium dioxide does not appear to oxidize retinal enol acetate to 4-hydroxyretinal.

Other features, embodiments and advantages of this invention will be readily apparent to those in the exercise of ordinary skill in the art after reading the foregoing disclosures. In this connection, while specific embodiments of this invention have been described in considerable detail, variations and modifications of these specific embodiments can be effected without departing from the spirit and scope of the invention as disclosed and claimed.

I claim:

1. A process for making 4-hydroxyretinal, which comprises: contacting retinal enol acetate with selenium dioxide in a liquid reaction medium selected from the group consisting of tetrahydrofuran, acetic acid, benzene and 1,4-dioxane, whereby a reaction product is formed; and contacting said reaction product with water.

2. A process for making 4-hydroxyretinal, which comprises: contacting at 20–25° C. for a period of time in a range from about 3 to about 18 hours retinal enol acetate with at least a chemically equivalent quantity of selenium dioxide in a liquid reaction medium selected from the group consisting of tetrahydrofuran, acetic acid, benzene and 1,4-dioxane, the quantity of said liquid reaction medium being at least sufficient to dissolve substantially all of said retinal enol acetate, whereby a reaction product is formed; and contacting at 20–25° C. said reaction product with at least a chemically equivalent quantity of water, whereby a reaction mixture comprising 4-hydroxyretinal is formed.

3. A process according to claim 2 wherein the mole ratio of selenium dioxide to retinal enol acetate is in a range from about 15:1 to about 3:1.

4. A process according to claim 2 wherein 4-hydroxyretinal is separated from said reaction mixture.

5. A process for making 4-hydroxyretinal, which comprises: contacting at 20–25° C. for a period of time in a range from about 3 to about 18 hours retinal enol acetate with selenium dioxide in tetrahydrofuran, the mole ratio of the selenium dioxide to said retinal enol acetate being in a range from about 15:1 to about 3:1 and the quantity of said tetrahydrofuran being in a range from about 3 to about 10 times the weight of said retinal enol acetate, whereby a reaction product is formed; and contacting at 20–25° C. said reaction product with at least a chemically equivalent quantity of water, whereby a reaction mixture comprising 4-hydroxyretinal is formed.

6. A process for making 4-hydroxyretinal, which comprises: admixing at 20–25° C. for a period of time in a range from about 3 to about 18 hours in a liquid reaction medium selected from the group consisting of tetrahydrofuran, acetic acid, benzene and 1,4-dioxane retinal enol acetate, selenium dioxide and water, the quantity of said liquid reaction medium being at least sufficient to dissolve substantially all of said retinal enol acetate, the mole ratio of said selenium dioxide to said retinal enol acetate being in a range from about 15:1 to about 3:1, and the quantity of said water being at least substantially chemically equivalent to the quantity present of said retinal enol acetate, whereby a reaction mixture comprising 4-hydroxyretinal is formed.

7. A process according to claim 6 wherein 4-hydroxyretinal is separated from said reaction mixture.

8. A process for making 4-hydroxyretinal from retinal, which comprises: reacting retinal with acetic anhydride to form retinal enol acetate; contacting said retinal enol acetate with selenium dioxide in a liquid reaction medium selected from the group consisting of tetrahydrofuran, acetic acid, benzene and 1,4-dioxane, whereby a reaction product is formed; and contacting said reaction product with water, whereby a reaction mixture comprising 4-hydroxyretinal is formed.

References Cited

Henbest et al., Jour. Chem. Soc. (London), (1957), pages 4909–4912.

BERNARD HELFIN, *Primary Examiner.*